United States Patent [19]
Ogawa

[11] Patent Number: 4,944,871
[45] Date of Patent: Jul. 31, 1990

[54] FILTERING DEVICE

[75] Inventor: Yonekichi Ogawa, Tokyo, Japan

[73] Assignee: Suisaku Kabushiki Kaisha, Tokyo, Japan

[21] Appl. No.: 205,780

[22] Filed: Jun. 13, 1988

[30] Foreign Application Priority Data

Jun. 11, 1987 [JP] Japan .................. 62-145889

[51] Int. Cl.$^5$ ............................... B01D 29/56
[52] U.S. Cl. ..................... 210/169; 210/209; 210/316; 210/416.2
[58] Field of Search ............ 210/169, 416.2, 437, 210/446, 209, 316; 119/3, 5

[56] References Cited

U.S. PATENT DOCUMENTS

| | | |
|---|---|---|
| 2,515,538 | 7/1950 | Wall ........................ 210/169 |
| 2,782,161 | 2/1957 | Willinger et al. .............. 210/169 |
| 3,006,476 | 10/1961 | Halpert ....................... 210/169 |
| 3,151,069 | 9/1964 | Halpert ....................... 210/169 |
| 3,662,889 | 5/1972 | Takarabe ..................... 210/169 |
| 3,891,555 | 6/1975 | Bennett et al. ................ 210/169 |
| 4,385,989 | 5/1983 | Margolis ...................... 210/169 |
| 4,392,953 | 7/1983 | Cornelius et al. .............. 210/169 |
| 4,601,821 | 7/1986 | Sherman et al. ............... 210/169 |
| 4,620,924 | 11/1986 | Goldman et al. ............... 210/169 |
| 4,802,980 | 2/1989 | Gilkey et al. ................. 210/169 |

FOREIGN PATENT DOCUMENTS

| | | |
|---|---|---|
| 0151852 | of 0000 | European Pat. Off. . |
| 0212975 | of 0000 | European Pat. Off. . |
| 3044376 | of 0000 | Fed. Rep. of Germany . |
| 3136243 | of 0000 | Fed. Rep. of Germany . |
| 62-42710 | of 0000 | Japan . |
| 62-57621 | of 0000 | Japan . |
| 2141040 | of 0000 | United Kingdom . |

Primary Examiner—Peter Hruskoci
Attorney, Agent, or Firm—Armstrong, Nikaido, Marmelstein, Kubovcik & Murray

[57] ABSTRACT

A filtering device to be mounted in a water basin for aquarium fishes, comprises a vertically extending tubular filter case attached to the wall surface of the water basin and having a filtering chamber and closed upper and lower ends, a vertically extending filtering material accommodated in the interior of said filter case to divide the filtering chamber into an outer unpurified chamber and an inner purified chamber, a vertically extending suction pipe being fixedly secured to the filter case in the purified chamber and communicating with the lower end of the purified chamber, the filter case being perforated with a water intake port communicated to the unpurified chamber, and a pump unit being mounted on the filter case so as to circulate water in the suction pipe from the upper end of the suction pipe into the water basin.

8 Claims, 7 Drawing Sheets

FILTERING DEVICE

BACKGROUND OF THE INVENTION

1. Field of the Invention

The present invention relates to a filtering device to be mounted in a water basin in which aquarium fishes are cultivated and more particularly, to a filtering device for filtering and purifying water in the water basin with use of filtering materials.

2. Description of the Prior Art

A hitherto known filtering device is generally constructed such that a pump is mounted on the upper end of a vertically extending suction pipe disposed in a water basin and water sucked up by means of the pump is filtered by allowing it to flow through filtering materials located at the upper portion of the water basin.

However, due to the fact that the pump and the filtering materials are located at the upper portion of the water basin, the conventional filtering device has drawbacks that it does not exhibit a good appearance because a large part of space at the upper portion of the water basin is occupied by the pump and the filtering materials, and a space required for mounting a fluorescent lamp and other components is reduced. Another drawback of the conventional filtering device is that it produces a relatively large noise by operation of the pump because it is disposed above the upper portion of the water basin.

SUMMARY OF THE INVENTION

The present invention has been made with the foregoing background in mind and its object resides in providing a filtering device which assures that the whole device is constructed in a compact structure, the upper portion of a water basin exhibits a good appearance, an ample space required for mounting a fluorescent lamp and other components is reserved and a level of noisy sound generated by operation of a pump is reduced remarkably.

To accomplish the above object, the present invention provides a filtering device comprising a vertically extending tubular filter case attached to a wall surface of a water basin, the case having a filtering chamber therein and upper and lower ends closed, a vertically extending filtering material being accommodated in an interior of said filter case so as to divide said filtering chamber into an outer unpurified chamber and an inner purified chamber, a vertically extending suction pipe being fixedly secured to said filter case in said purified chamber and communicating with a lower end of the purified chamber, the filter case being perforated with a water intake port communicated to the unpurified chamber, and a pump unit being mounted on the filter case so as to circulate water in said suction pipe from an upper end of the suction pipe into the water basin.

With such arrangement, both the filter case and the pump unit are united together in a compact structure, the upper portion of the water basin exhibits a fine appearance, and an ample space is reserved at the upper portion of the water basin located above the filtering device for the purpose of mounting more components such as fluorescent lamp or the like. Further, the pump unit can be disposed within the water basin, resulting in generation of noisy sound being reduced remarkably.

Further according to additional feature of the present invention, the filter case is provided at its lower portion with a partition wall dividing the interior of the filter case into an upper filtering chamber and a lower water suction chamber which is communicated with the purified chamber, and a pump unit is detachably mounted on the upper portion of the filter case, said pump unit including a water discharge port, a passage which allows communication between said water discharge port and the upper end of the suction pipe and a pump housed in the unit and having a blade disposed midway of said passage.

The above and other objects, features and advantages of the present invention will become readily apparent from reading of the following description which has been made in conjunction with the accompanying drawings.

BRIEF DESCRIPTION OF THE DRAWINGS

The accompanying drawings illustrate one embodiment of the present invention, wherein.

DESCRIPTION OF THE PREFERRED EMBODIMENT

Now, the present invention will be described in a greater detail hereunder with reference to the accompanying drawings which illustrate a preferred embodiment thereof.

Figure 1:
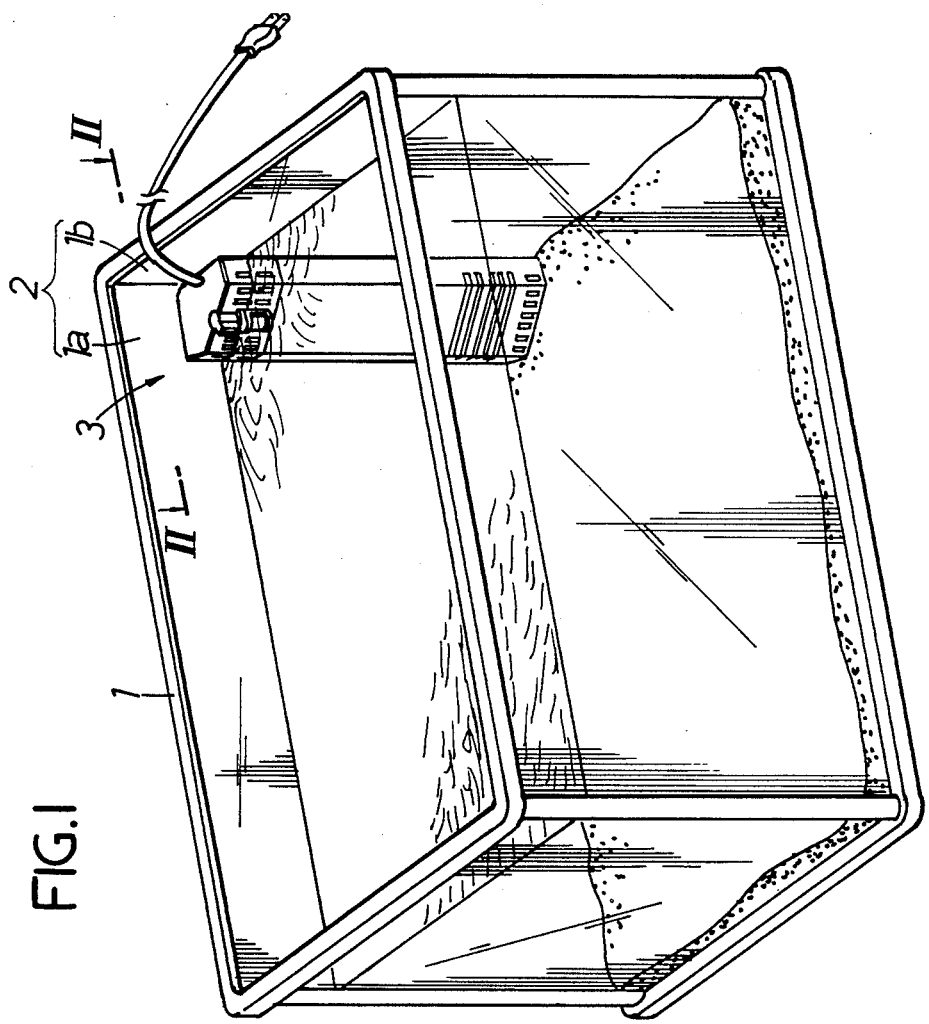
FIG. 1 is a perspective view illustrating a water basin to which a filtering device of the present invention is attached.

Referring first to FIG. 1, a water basin 1 usable for cultivating aquarium fishes such as goldfishes, tropical fishes, saltwater fishes or the like is constructed in a box-like configuration and a filtering device 3 is attached to a corner section 2 which is defined by two wall surfaces 1a and 1b, intersecting at right angles, of the water basin 1.

Figure 2:
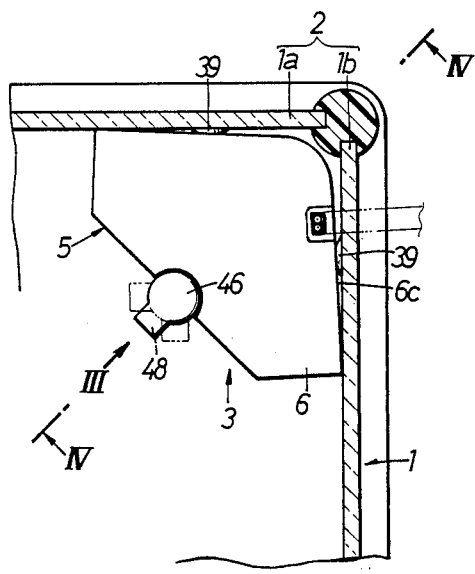
FIG. 2 is a fragmental enlarged sectional view of the filtering device taken in line II—II in FIG. 1.
Figure 3:
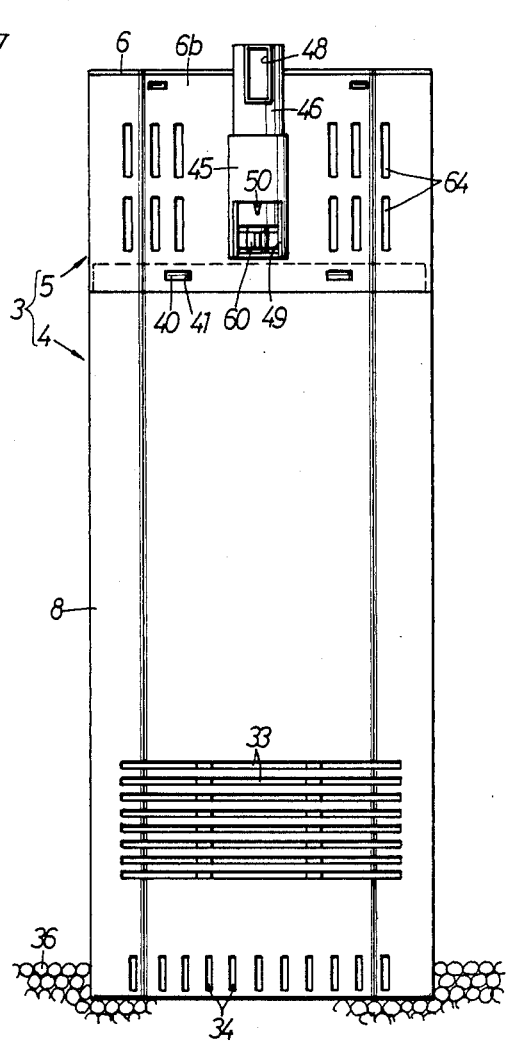
FIG. 3 is a front view of the filtering device as viewed in the direction of an arrow mark III in FIG. 2.
Figure 4:
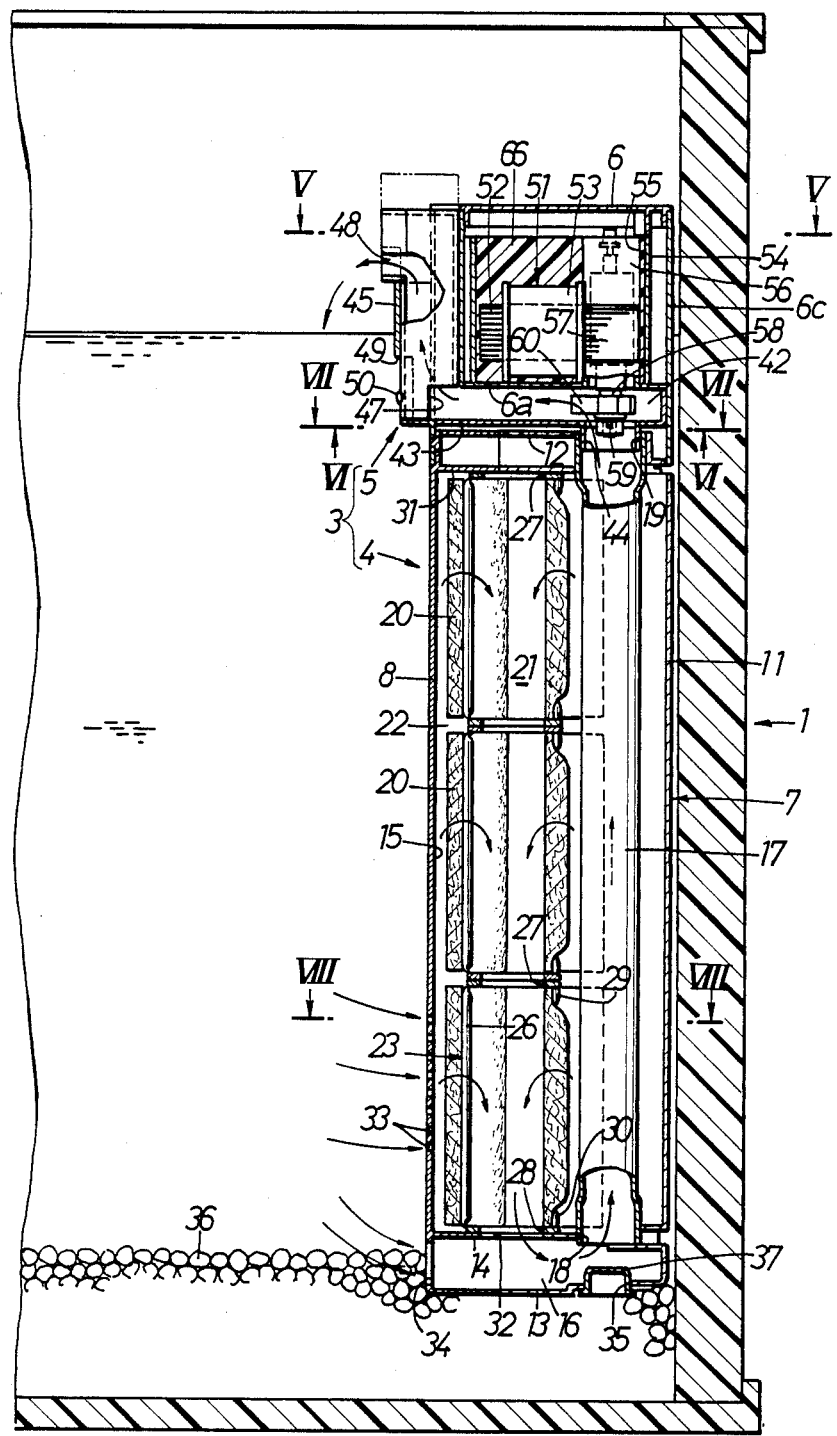
FIG. 4 is a vertical sectional view of the filtering device taken in line IV—IV in FIG. 2.
Figure 5:
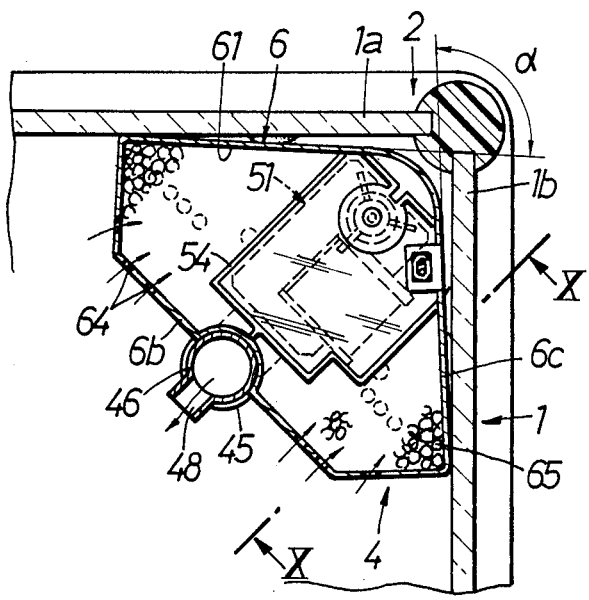
FIG. 5 is a fragmental sectional view of the filtering device taken in line V—V in FIG. 4.
Figure 6:
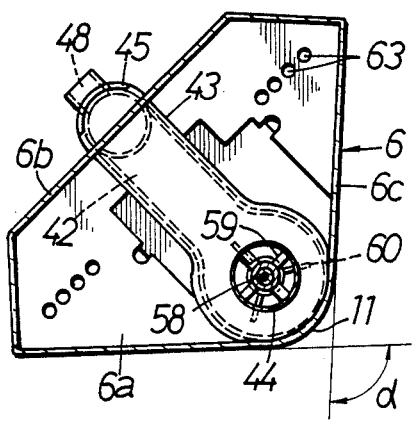
FIG. 6 is a sectional view of the filtering device taken in line VI—VI in FIG. 4.
Figure 8:
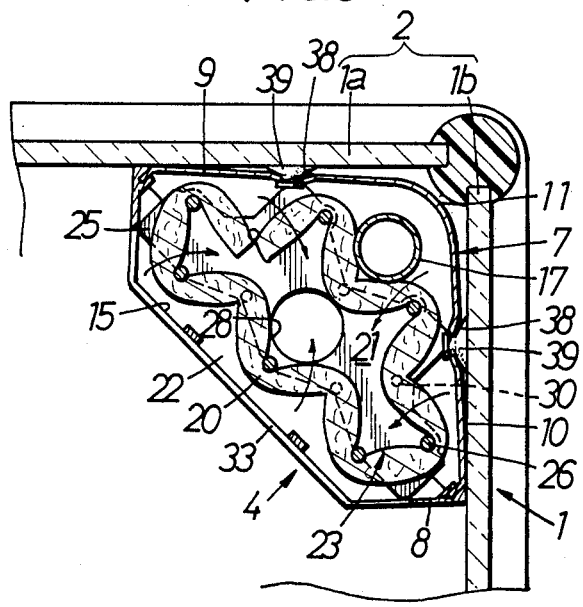
FIG. 8 is a sectional view of the filtering device taken in line VIII—VIII in FIG. 4.
Figure 7:
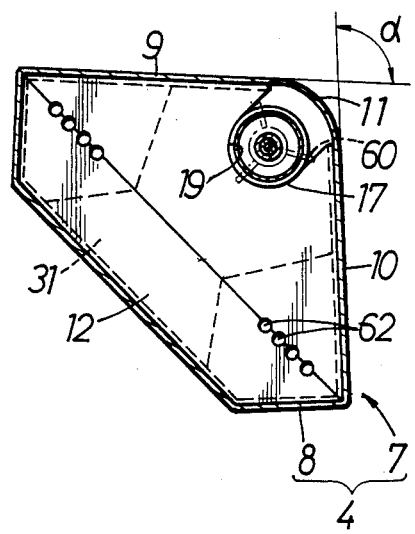
FIG. 7 is a sectional view of the filtering device taken in line VII—VII in FIG. 4.

As shown in FIGS. 2, 3 and 4, the filtering device 3 is formed in such a manner that a pump unit 5 is detachably fitted to the upper portion of a vertically extending filter case 4. Both the filter case 4 and a casing 6 of the pump unit 5 are made of synthetic resin and cooperate together to form a housing of the filtering device 3.

Referring also to FIGS. 5, 6, 7 and 8, the filter case 4 is comprised of a back wall 7 facing the corner section 2 and a front surface 8 facing the interior of the water basin 1 both of which are interconnected thereby to form a closed loop as viewed in a horizontally sectioned plane. The back wall 7 includes a pair of mounting portions 9 and 10 which are connected to one another via a connecting portion 11. Both the mounting portions 9 and 10 are arranged so that an angle α defined therebetween in a natural state is set to be, for instance, 95° which is slightly larger than the angle of 90° defined by both the wall surfaces 1a and 1b. The connecting portion 11 is shaped into a circular arc curved to be convex toward the corner section 2. On the other hand, the front wall 8 is formed into a trapezoidal shape converging toward the inside of the water basin 1. The opposite side ends of the front wall 8 and the outer ends of the mounting portions 9 and 10 of the back wall 7 are fitted together to be interconnected.

The back wall 7 and the front wall 8 are integrally provided with plate portions at the upper ends thereof, respectively to cooperatively form a ceiling plate 12 when they are jointed together. Similarly, the back wall 7 and the front wall 8 are integrally provided with plate portions at the lower ends thereof, respectively, to cooperatively form a bottom plate 13 when they are jointed together. Accordingly, when the filter case 4 is constructed by connecting the back wall 7 and the front wall 8 to each other, both the upper and lower ends of the filter case 4 are closed with the ceiling plate 12 and the bottom plate 13, respectively. Further, the back wall 7 and the front wall 8 are integrally provided with plate portions at the lower ends thereof, respectively, to cooperatively form a partition wall 14 when they are jointed together. By the partition wall 14, the interior of the filter case 4 is divided into two parts, one of them being a filtering chamber 15 defined between the ceiling plate 12 and the partition wall 14 and the other one being a water suction chamber 16 defined between the partition wall 14 and the bottom plate 13.

A vertically extending suction pipe 17 is fixedly disposed in the filter case 4 at a position located in the proximity of the back wall 7 of the filter case 4. Specifically, the lower end of the suction pipe 17 is fitted into a through hole 18 formed in the partition wall 14 so that the pipe 17 is connected to the water suction chamber 16, while the upper end of the suction pipe 17 is fitted into a through hole 19 formed in the ceiling plate 12 so that it is opened at the upper surface of the ceiling plate 12.

Figure 9:
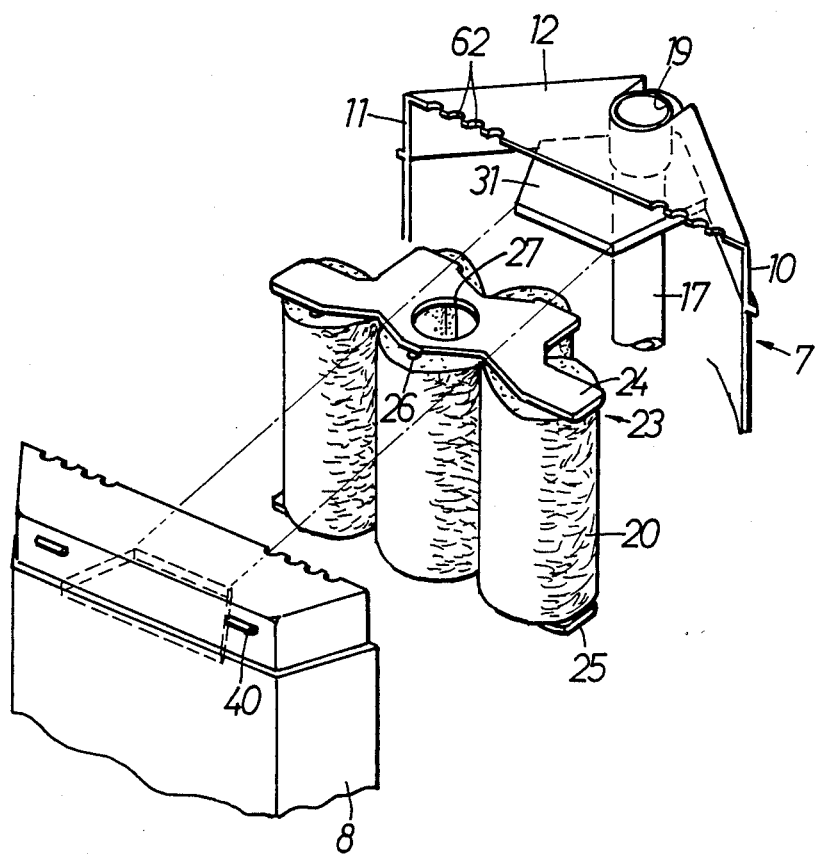
FIG. 9 is a perspective view of the upper portion of a filter case shown in a disassembled state.

Referring additionally to FIG. 9, three tubular filtering materials 20 are arranged one above another in the filtering chamber 15 at a position located closer to the front wall 8 than the suction pipe 17 and the interior of the filtering chamber 15 is divided by cooperation of the filtering materials 20 into a purified chamber 21 located inwardly of the filtering materials 20 and an unpurified chamber 22 located outwardly of the filtering materials 20.

Each of the filtering materials 20 is previously formed into a rectangular mat-like shape, and it is fitted over a support frame 23 so as to have a tubular shape. The support frame 23 is so constructed that a pair of upper and lower support plates 24 and 25 are connected to each other via a plurality of connecting rods 26, and both the support plates 24 and 25 are coaxially provided with communication holes 27 and 28. Indeed, the support plates 24 and 25 are formed with a plurality of engagement projections 29 and 30 on their opposed surfaces, respectively, in such a manner that each of them is located between the adjacent connecting rods 26 and inwardly of the latter. Thus, the filtering material 20 is attached to the support frame 23 such that it is wound around the connecting rods 26 while being bent inwardly to be engaged with the projections 29 and 30 at positions between the adjacent connecting rods 26.

The three filtering materials 20 thus mounted to the respective support frames 23 in a tubular shape are coaxially piled up one above another so as to have mutual communication through the communication holes 27 and 28, and these piled-up filtering materials 20 are then clamped between a clamping plate 31 disposed at the upper portion of the filter case 4 and the partition wall 14. It should be noted that the communication hole 27 on the uppermost support frame 23 is closed by the clamping plate 31 and the communication hole 28 on the lowermost support frame 23 is communicated with the water suction chamber 16 via an introduction hole 32 perforated in the partition wall 14.

A plurality of slit-like water intake ports 33 are perforated at the lower part of the front wall 8 of the filter case 4 with vertical spacings therebetween so as to communicate with the lower part of the unpurified chamber 22. In addition, a plurality of auxiliary water intake ports 34 in the form of a vertically extending slit are provided at the lower portion of the front wall 8 to communicate with the water suction chamber 16.

The bottom plate 13 of the filter case 4 is formed with a connection hole 35 at a position opposed to the lower end of the suction pipe 17. To the connection hole 35, a so-called bottom surface type filtering device may be connected if filtration is desired by using gravel 36 spreaded over the bottom of the water basin 1. If such bottom surface type filtering device is not used, the connection hole 35 is closed with a cap 37.

Both the mounting portions 9 and 10 of the back wall 7 of the filter case 4 are provided at their outer surfaces with two pairs of recesses 38 with a vertical spacing between the pairs. A sucker 39 is fixedly fitted to each of the recesses 38 in such a manner that its fore end is projected outwardly of the outer surfaces of the mounting portions 9 and 10.

The casing 6 of the pump unit 5 is formed in a boxlike configuration with its cross-section corresponding to that of the filter case 4. The casing 6 is fitted onto the upper portion of the filter case 4, and the former is united with the latter by permitting engagement projections 40 projected from the upper portion of the filter case 4 to be engaged to engagement holes 41 formed in the casing 6.

The casing 6 is provided with a passage member 43 at the lower portion thereof to form a passage 42 in an area between the passage member 43 and a bottom plate 6a of the casing 6. The passage member 43 is integrally formed with a fitting sleeve 44 which is fitted into the upper end of the suction pipe 17 when the casing 6 is fitted onto the filter case 4. Consequently, the upper end of the suction pipe 17 is communicated with the passage 42.

A vertically extending guide sleeve 45 with its lower end closed is made integral with a center portion of a front wall 6b of the casing 6 which faces the interior of the water basin 1. A discharge pipe 46 with its upper end closed is slidably fitted in the guide sleeve 45. On the other hand, the other end of the passage 42 is communicated with the guide sleeve 45 and the discharge pipe 46 is formed with a notch 47 on the lower side wall thereof through which the passage 42 is communicated with the discharge pipe 46. Further, the discharge pipe 46 is formed with a water discharge port 48 at the upper portion thereof which is opened toward the interior of the water basin 1. A position assumed by the discharge pipe 46 can be adjusted as required by slidably displacing the discharge pipe 46 in the guide sleeve 45. Further, an orientation of the water discharge port 48 as viewed in the horizontally extending plane can be adjusted within the range of a certain angle, for instance, 90°.

The guide sleeve 45 is formed at its lower portion with an auxiliary rectangular water discharge port 49 which is aligned with the passage 42. In order to limit a vertical position of the guide sleeve 45 in the discharge pipe 46, the discharge pipe 46 is provided with a projection 50 adapted to be engaged to the upper edge of the auxiliary discharge port 49.

The casing 6 has a pump 51 incorporated therein and a core 52 and a coil 53 for the pump 51 are disposed in a box-shaped accommodating chamber 55 which is defined by a wall 54 in the casing 6. Further, the accommodating chamber 55 is provided with a vertically extending bottomed support sleeve 56 which is opened at the upper portion of the fitting sleeve 44 at one end of the passage 42, and a rotor 57 is rotatably disposed in the interior of the support sleeve 56. The upper end of a rotational shaft 58 made integral with the rotor 57 is rotatably supported by the upper closed end of the support sleeve 56, while the lower end of the rotational shaft 58 is rotatably supported by a bearing portion 59 which is provided at a junction where the fitting sleeve 44 is jointed to the passage member 43. A plurality of blades 60 exposed to the passage 58 are mounted on the rotational shaft 58 so that a water stream is generated upwardly in the suction pipe 17 and a water stream is then generated toward the water discharge port 48 and the auxiliary water discharge port 49 in the passage 42 under the effect of rotation of the blades 50.

Figure 10:
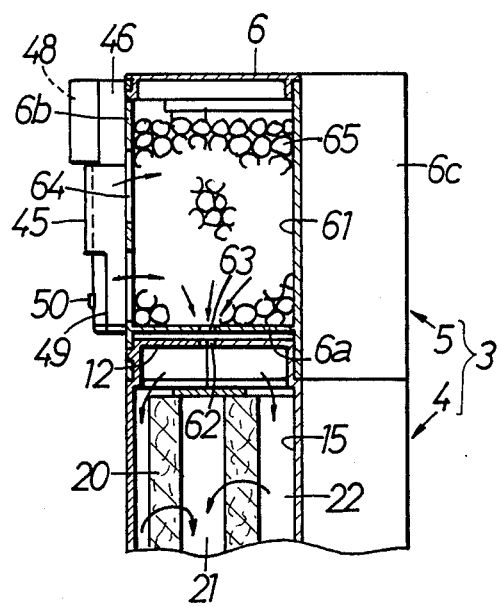
FIG. 10 is a sectional view of the filtering device taken in line X—X in FIG. 5.

Referring additionally to FIG. 10, an auxiliary filtering chamber 61 is defined in an area located outwardly of the wall 54 in the casing 6. In order to assure that the auxiliary filtering chamber 61 is communicated with the unpurified chamber 22 in the filter case 4 when the casing 6 is united with the filter case 4, the ceiling plate 12 of the filter case 4 and the bottom plate 6a of the casing 6 are formed with a plurality of communication holes 62 and 63 which correspond to one another. Further, the front wall portion 6b of the casing 6 is formed with a plurality of auxiliary water intake ports 64 in the form of a vertically extending slit which are communicated with the auxiliary filtering chamber 61. Thus, when a water stream is generated downwardly in the purified chamber 21, a water stream is generated to flow from the auxiliary water intake ports 64 into the unpurified chamber 22 via the auxiliary filtering chamber 61 and the communicating holes 62 and 63. The auxiliary filtering chamber 61 is filled with gravel 65, water property improving agent or the like. In order to assure that a property of electric insulation of the core 52 and the coil 53 is maintained, the accommodating chamber 55 is filled with an insulation material 66 such as synthetic resin or the like after the core 52 and the coil 53 are accommodated in place therein. A pair of suckers 39 are fixedly attached to each of the back wall portions 6c of the casing 6 facing the corner section 2 in the same way as in the case of the filter case 4.

Next, description will be made below as to operation of the filtering device as constructed in accordance with the foregoing embodiment.

In attaching the filtering device 3 to the water basin 1, both the back wall 7 and the back wall portions 6c are faced to the corner section 2 so that the water discharge port 48 is located in the proximity of a level of water in the water basin 1. In this state, the one mounting portion 9 is thrusted against the one wall surface 1a so that the suckers 39 are attached to the wall surface 1a. Next, the other mounting portion 10 is thrusted against the other wall surface 1b so that the suckers 39 are likewise attached to the wall surface 1b. At this moment, both the mounting portions 9 and 10 define in a natural state an angle $\alpha$ larger than an angle defined by both the wall surfaces 1a and 1b. Owing to this, the joint portion 11 side of the one mounting portion 9 is moved away from the wall surface 1a while the end part of the same on the front wall 8 side is thrusted against the wall surface 1a. Thus, closed spaces between the suckers 39 on the mounting portion 9 and the wall surface 1a are depressurized, resulting in an intensity of adhesive force produced by the suckers 39 being increased.

When the mounting portion 10 is released from the thrusted state, the end portion of the mounting portion 10 at the side of the front wall 8 is moved away from the wall surface 1b under the influence of the adhesive force produced by the suckers 39 on the mounting portion 9 side. Thus, closed spaces between the suckers 39 and the wall surface 1b are depressurized, resulting in an intensity of adhesive force produced by the suckers 39 being increased in the same way as mentioned above. Consequently, the mounting portion 10 is attached to the wall surface 1b reliably. While the foregoing attachment state is maintained, the water intake ports 33 are located above the gravel 36, the auxiliary water discharge port 49 is located below a level of water and the water discharge port 48 is located above a level of water.

In this state, the end parts of the back wall 7 and the back wall portions 6c at the side of the front wall 8 are brought in close contact with both the wall surfaces 1a and 1b, resulting in a space between the filtering device 3 and the corner section 2 being closed. Accordingly, it can reliably prevent aquarium fish from entering between the filtering device 3 and the water basin 1 to be immovable.

When the pump 51 is operated after completion of attachment of the filtering device 3 in that way, a water stream is produced from the purified chamber 21 to the water discharge port 48 and the auxiliary water discharge port 49 of the discharge pipe 46 via the water suction chamber 16, the suction pipe 17 and the passage 42. Thus, water introduced into the unpurified chamber 22 through the water intake ports 33 is purified while it passes through the filtering materials 20. Thereafter, it is circulated from the water discharge port 48 or the auxiliary water discharge port 49 to the water basin 1. At this moment, a small amount of water which is purified by the gravel 65 in the auxiliary filtering chamber 61 enters the purified chamber 22. Further, a small amount of water is introduced into the water intake chamber 16 through the auxiliary water intake ports 34. The speed of water flowing through the filtering materials 20 is adjusted to a suitable value for promoting growth of chlorella or aerobic micro-organism, so that the organic substances such as leftover baits and dungs of aquarium fishes can be decomposed by the aerobic microbes to prevent the clogging of the filtering materials 20. In addition, it is possible to provide chlorella or the like as live feed for aquarium fishes.

Further, since a position of the discharge pipe 46 can be vertically adjusted, a ratio of amount of the water to be discharged from the auxiliary water discharge port 49 and amount of water to be discharged from the water discharge port 48 can be adjusted adequately by properly adjusting a position of the water discharge port 48 in the vertical direction. For instance, in a case where water is discharged from the water discharge port 48, an amount of oxygen to be dissolved in water can be increased. However, in a case where many aquatic plants are disposed in the interior of the water basin 1, there is no need of improving dissolution of oxygen in water with the aid of falling-down of water on the water surface. In this case, water may be discharged through the auxiliary water discharge port 49. By doing so, discharged water is not dropped on the water surface sound of water dropping can be eliminated. Further, by turning the water discharge pipe 46 in the guide sleeve 45, an orientation of the water discharge port 48 can be varied within a certain range of angle, for instance, 90°, whereby flowing of water in the water basin 1 can be adjusted suitably.

Since the core 52 and the coil 53 of the motor 51, the rotor 57 and the like may be located below the water level, sound generated by operation of the motor 51 can be reduced substantially. In addition, it is possible to cool the heated motor 51 with water flowing through the auxiliary filtering chamber 61. Further, by pulling the discharge pipe 46 upwardly to open the auxiliary discharge port 49, the blades 60 located at the farthest position in the passage 42 can be easily inspected.

Since the filtering device 3 is so constructed that the pump unit 5 is mounted on the upper portion of the filter case 4, it can be arranged in a compact structure in the water basin 1 and an ample space can be secured above the device 3. This arrangement makes it possible to obtain an increased space for mounting a fluorescent lamp or the like components at the upper portion of the water basin 1. Further, a level of noisy sound can be reduced by damping sound produced by operation of the pump 51 in the water basin 1.

In the foregoing embodiment, the pump unit is mounted at the upper portion of the filter case. However, even if the pump unit is mounted at the lower portion of the filter case alternatively, the same advantageous effects as in the foregoing embodiment can be assured.

What is claimed is:

1. A filtering device comprising a vertically extending housing attached to a wall surface of a water basin, the housing having a filtering chamber therein, a water intake port and a water discharge port, these intake and discharge ports communicating with the filtering chamber, a vertically extending filtering material being accommodated in an interior of said housing so as to divide said filtering chamber into an unpurified chamber and a purified chamber on opposite sides of the material, a vertically extending suction pipe mounted in said housing and communicating with a lower end of the purified chamber as well as with said water discharge port, said water intake port communicating with the unpurified chamber, and a pump unit including a motor being mounted in the housing so as to circulate water in said suction pipe from an upper end of the suction pipe into the water basin through the water discharge port, said housing further having an auxiliary filtering chamber therein surrounding a sufficient portion of said pump unit to cool said motor with water flowing through said auxiliary filtering chamber during operation of said device, said auxiliary filtering chamber communicating with an auxiliary water intake port perforated in the housing and with the unpurified chamber to admit water flow from the auxiliary water intake port to the unpurified chamber through the auxiliary filtering chamber.

2. The filtering device of claim 1, wherein the housing is provided at a lower portion thereof with a partition wall between said filtering chamber on an upper side and a water suction chamber defined on a lower side which is communicated with the purified chamber as well as with a lower end of the suction pipe, and wherein said pump unit is mounted on an upper portion of the housing.

3. The filtering device of claim 1, wherein said housing comprises a filter case having said filtering chamber defined therein and a casing which accommodates the pump unit therein.

4. The filtering device of claim 3, wherein said water intake port is formed in said filter case and said water discharge port is formed in said casing for the pump unit, said filter case and said casing being separably assembled with each other and constructed such that in an assembled state thereof the upper end of the suction pipe and the water discharge port are connected together.

5. The filtering device of claim 4, wherein aid auxiliary water intake port and said auxiliary filtering chamber are formed in said casing for the pump unit and in an assembled state of said casing and the filter case the auxiliary filtering chamber is connected to said unpurified chamber in the filter case.

6. The filtering device of claim 1, wherein said auxiliary filtering chamber is filled with a filtering material.

7. The filtering device of claim 6, wherein said filtering material is gravel.

8. The filtering device of claim 1, wherein said auxiliary filtering chamber is filled with a water property improving agent.

* * * * *